United States Patent
Filsfils et al.

(10) Patent No.: US 11,184,235 B2
(45) Date of Patent: Nov. 23, 2021

(54) IN-BAND DIRECT MODE PERFORMANCE LOSS MEASUREMENT IN SOFTWARE DEFINED NETWORKS

(71) Applicant: Cisco Technology, Inc., San Jose, CA (US)

(72) Inventors: Clarence Filsfils, Brussels (BE); Rakesh Gandhi, Stittsville (CA); Zafar Ali, Hicksville, NY (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/191,676

(22) Filed: Nov. 15, 2018

(65) Prior Publication Data

US 2019/0280927 A1 Sep. 12, 2019

Related U.S. Application Data

(60) Provisional application No. 62/639,047, filed on Mar. 6, 2018.

(51) Int. Cl.
*H04L 12/24* (2006.01)
*H04L 12/26* (2006.01)
(Continued)

(52) U.S. Cl.
CPC ...... *H04L 41/0826* (2013.01); *H04L 43/0835* (2013.01); *H04L 45/24* (2013.01);
(Continued)

(58) Field of Classification Search
CPC . H04L 41/0826; H04L 43/0835; H04L 45/24; H04L 45/64; H04L 47/2483; H04L 63/101

See application file for complete search history.

(56) References Cited

U.S. PATENT DOCUMENTS 6,084,858 A * 7/2000 Matthews ............. H04L 45/125
  370/238
6,188,674 B1 2/2001 Chen et al.
(Continued)

FOREIGN PATENT DOCUMENTS

EP 3001643 A1 * 3/2016 ......... H04L 67/1008

OTHER PUBLICATIONS

Cao et al., Performance of hashing-based schemes for internet load balancing, Mar. 2000, IEEE ISBN 0-7803-5880-5 (Year: 2000).*

(Continued)

*Primary Examiner* — Scott B Christensen
*Assistant Examiner* — Fadi Haj Said
(74) *Attorney, Agent, or Firm* — Edell, Shapiro & Finnan, LLC

(57) ABSTRACT

Mechanisms are provided for "direct mode" (in-band) performance loss measurement in computer networks where packet loss is measured directly in the data plane using techniques based on ECMP paths. Counters on each of an ingress node and an egress node are configured by a network controller to count traffic for indicators associated with different equal-cost multi-path (ECMP) paths through a network between ingress and egress nodes. Each indicator is toggled on or off during a measurement interval during which traffic is measured by the traffic counters on the ingress and egress nodes for each ECMP path. The traffic counters (measured in bytes/packets) from the ingress and egress nodes are sent via event driven telemetry to the network controller for performance loss measurement determination.

17 Claims, 9 Drawing Sheets

(51) Int. Cl.
 *H04L 12/851* (2013.01)
 *H04L 12/715* (2013.01)
 *H04L 12/707* (2013.01)
 *H04L 29/06* (2006.01)

(52) U.S. Cl.
 CPC .......... *H04L 45/64* (2013.01); *H04L 47/2483* (2013.01); *H04L 63/101* (2013.01)

(56) References Cited

U.S. PATENT DOCUMENTS

| | | | | |
|---|---|---|---|---|
| 6,868,094 | B1* | 3/2005 | Bordonaro | H04L 41/5009 370/516 |
| 6,980,521 | B1* | 12/2005 | Jarvis | H04L 45/00 370/238 |
| 8,199,653 | B2* | 6/2012 | Bugenhagen | H04L 41/08 370/236.2 |
| 8,451,734 | B2 | 5/2013 | Cociglio | |
| 8,499,093 | B2* | 7/2013 | Grosser | H04L 61/103 370/392 |
| 9,397,913 | B1* | 7/2016 | Nimmagadda | H04L 43/0835 |
| 9,762,495 | B1* | 9/2017 | Chen | H04L 47/125 |
| 10,298,488 | B1* | 5/2019 | Wood | H04L 45/28 |
| 10,447,578 | B1* | 10/2019 | Matthews | H04L 45/22 |
| 2007/0002748 | A1* | 1/2007 | Nakata | H04L 45/00 370/238 |
| 2010/0008250 | A1* | 1/2010 | Nomura | H04L 43/0829 370/252 |
| 2012/0051234 | A1 | 3/2012 | Gintis et al. | |
| 2012/0287791 | A1* | 11/2012 | Xi | H04L 43/10 370/237 |
| 2013/0107712 | A1 | 5/2013 | Allan | |
| 2014/0092738 | A1* | 4/2014 | Grandhi | H04L 47/52 370/235 |
| 2014/0258524 | A1* | 9/2014 | Thyni | H04L 43/0852 709/224 |
| 2015/0188798 | A1* | 7/2015 | Mizrahi | H04L 45/44 370/252 |
| 2015/0319078 | A1* | 11/2015 | Lee | H04L 45/12 370/392 |
| 2015/0372916 | A1* | 12/2015 | Haramaty | H04L 45/24 370/392 |
| 2016/0065477 | A1* | 3/2016 | White | H04L 47/125 370/237 |
| 2016/0164741 | A1* | 6/2016 | Durgin | H04L 41/0836 370/255 |
| 2017/0118108 | A1 | 4/2017 | Avci et al. | |
| 2018/0019944 | A1* | 1/2018 | Peng | H04L 45/507 |
| 2018/0262397 | A1* | 9/2018 | Legallais | G06F 9/45558 |
| 2019/0014036 | A1* | 1/2019 | Anand | G06F 16/2322 |
| 2019/0268272 | A1 | 8/2019 | Mizrahi et al. | |
| 2020/0162367 | A1* | 5/2020 | Jiang | H04L 45/20 |
| 2020/0329129 | A1 | 10/2020 | Li et al. | |

OTHER PUBLICATIONS

S. Bryant et al., "Synonymous Flow Label Framework draft-ietf-mpls-sfl-framework-01", MPLS Working Group, Jan. 29, 2018, 10 pages.

G. Fioccola, Ed. et al., "Alternate-Marking Method for Passive and Hybrid Performance Monitoring", Internet Engineering Task Force (IETF), Jan. 2018, 33 pages.

D. Frost et al., "Packet Loss and Delay Measurement for MPLS Networks", Internet Engineering Task Force (IETF), Sep. 2011, 52 pages.

Z. Ali et al., "Performance Measurement in Segment Routing Networks with IPv6 Data Plane (SRv6) draft-ali-spring-srv6-pm-02.txt", Spring Working Group, Feb. 27, 2018, 17 pages.

A. Capello et al., "A packet based method for passive performance monitoring", Network Working Group, IETF, Mar. 21, 2016, 24 pages.

* cited by examiner

IN-BAND DIRECT MODE PERFORMANCE LOSS MEASUREMENT IN SOFTWARE DEFINED NETWORKS

CROSS-REFERENCE TO RELATED APPLICATION

This application claims the benefit of priority under 35 U.S.C. § 119 to U.S. Provisional Patent Application Ser. No. 62/639,047, entitled "IN-BAND PERFORMANCE LOSS MEASUREMENT IN SR-MPLS SOFTWARE DEFINED NETWORKS", filed on Mar. 6, 2018, the disclosure of which application is hereby incorporated by reference in its entirety.

TECHNICAL FIELD

The present disclosure relates to network performance loss measurement.

BACKGROUND

End-user applications are becoming more sensitive to packet loss and network operators are moving towards a strict Service Level Agreement (SLA)-based service delivery. In order to provide such strict SLA-based services, operators are required to quickly detect customer data traffic loss and take remedial action (e.g., identifying the faulty path and diverting the traffic over a different path). Segment-routing (SR) is a new technology that greatly simplifies network operations and makes networks Software Defined Network (SDN)-friendly. SR is applicable to both Multiprotocol Label Switching (MPLS), i.e., SR-MPLS, and Internet Protocol version 6 (IPv6), i.e., SRv6, data planes. Built-in Performance Measurement (PM) and Fault Detection (FD) are important requirements for the success of this new technology.

DESCRIPTION OF EXAMPLE EMBODIMENTS

Overview

Figure 1:
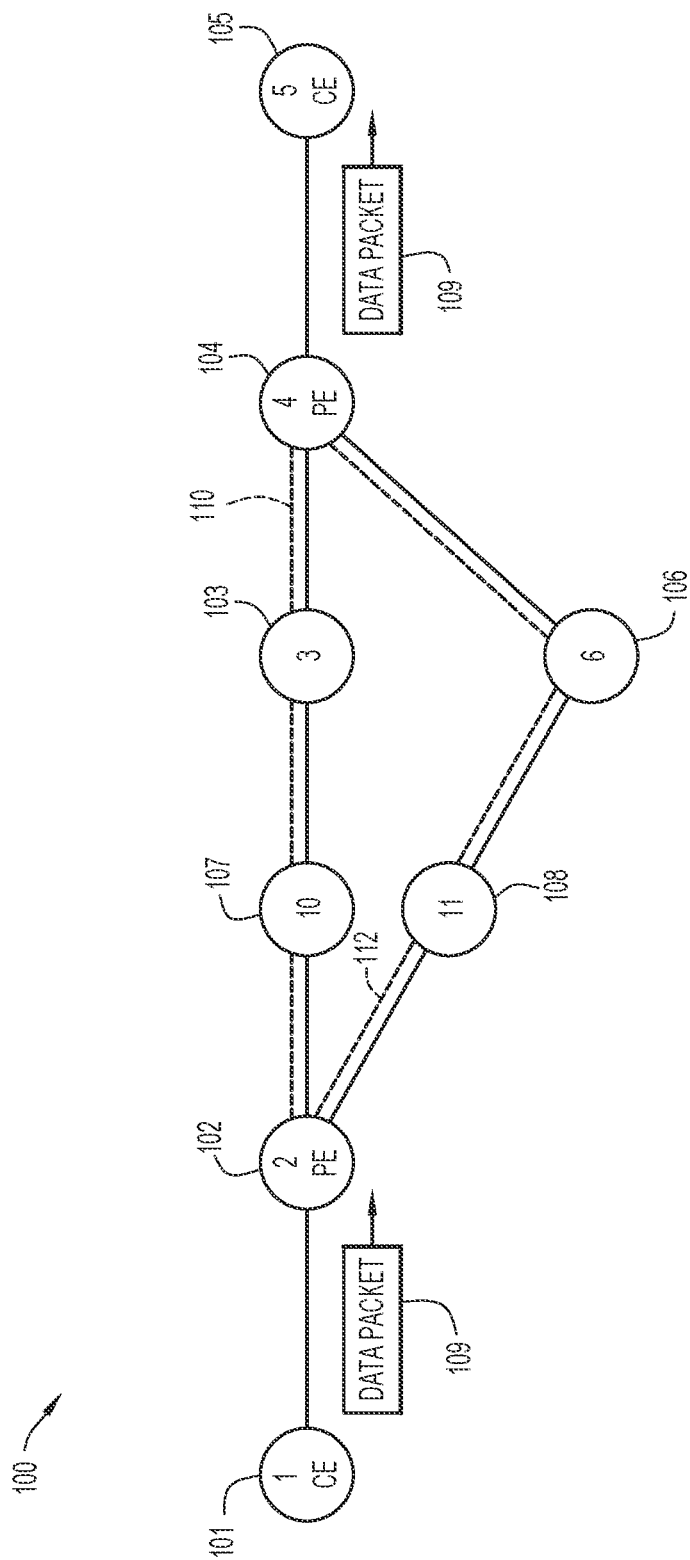
FIG. 1 is a diagram illustrating a network in which techniques for in-band loss performance measurement may be implemented, according to an example embodiment.

Presented herein are techniques for "direct mode" (in-band) performance loss measurement in computer networks where packet loss is measured directly in the data plane. In an example embodiment, a method includes assigning, at a first network element, one of a first indicator or a second indicator to a first equal-cost multi-path (ECMP) path from the first network element to a second network element. The method also includes transmitting, from the first network element, a plurality of packets over the first ECMP path during a first measurement interval. The plurality of packets transmitted over the first ECMP path include a field in a packet header of each packet of the plurality of packets that includes the first indicator or the second indicator. The method further includes counting, by the first network element, packets of the plurality of packets transmitted by the first network element during the first measurement interval using a first counter. The method includes receiving, at a second network element, one or more packets from the first network element and determining, by the second network element, whether the field in the packet header of the received one or more packets includes the first indicator or the second indicator. The method also includes counting, by the second network element, packets received by the second network element that include the first indicator in the field of the packet header using a first counter and packets received by the second network element that include the second indicator in the field of the packet header using a second counter. A loss measurement value is determined for the first ECMP path based on a difference between packets counted by the first counter of the first network element and packets counted by one of the first counter or the second counter of the second network element.

DETAILED DESCRIPTION

SR policies as defined in Internet Engineering Task Force (IETF) Segment Routing Policy for Traffic Engineering publication, available at tools.ietf.org/html/draft-filsfils-spring-segment-routing-policy, are used to steer traffic through a specific, user-defined path using a stack of MPLS labels for SR-MPLS and IPv6 addresses for SRv6. One typical customer requirement is to verify that the traffic is arriving at the egress nodes of the SR policy. In an SR network, there is a requirement to measure customer traffic and detect any packet loss in data plane (known as direct mode) on SR policies.

Network operators would like to obtain data on performance traffic counters/loss for the following Operations Administration and Management (OAM)/Performance Measurement (PM) use-cases on a centralized controller. Examples of such OAM/PM uses cases include: in-band traffic loss measurement for end-to-end SR policy; in-band traffic loss measurement for SR links (e.g., to be able to support IETF RFC 7810); centralized controller-based use-cases for OAM, and Netflow based traffic stats collection as well as synthetic probe based measurements for in-band traffic loss. Performance loss measurement and monitoring by the centralized controller then can be used for SLAs.

Referring now to FIG. 1, a network 100 in which techniques for in-band loss performance measurement may be implemented is shown according to an example embodiment. For example, in some embodiments, network 100 may be an SR-MPLS or SRv6 network.

In this embodiment, network 100 includes a plurality of network elements or nodes, including a first customer edge node 101, a first network element 102, a first transit node element 103, a second transit node 106, a third transit node 107, a fourth transit node 108, a second network element 104, and a second customer edge node 105. In this embodiment, customer edge nodes 101, 105 may be a network element (e.g., a router) that is located on a customer's premises that provides an interface to/from a provider's core network. For example, in this embodiment, the provider's core network may be represented by first network element 102, first transit node 103, second transit node 106, third transit node 107, fourth transit node 108, and second network element 104 of network 100.

In various embodiments, network elements or nodes of network 100 may be endpoints of any of a variety of types, such as routers, servers, switches, data storage devices, gateways, as well as networking appliances, such as firewalls, intrusion detection systems, etc. The endpoints may be physical, virtual (e.g., implemented in software), or a combination of both. In an example embodiment, first network element 102 and second network element 104 may be routers that are configured to route packets through network 100, including routing packets between first customer edge node 101 and second customer edge node 105.

In the present embodiments, SR network (e.g., network 100) as an example may employ ECMP routing techniques to forward packets through the network along one of multiple ECMP paths. Referring back to FIG. 1, in this embodiment, a packet flow or traffic may originate from customer edge node 101. The traffic flow comprises a plurality of packets, including a first data packet 109. First data packet 109 may be forwarded through network 100 from first network element 102 (i.e., ingress node) to second network element 104 (i.e., egress node) along one of at least two ECMP paths, a first ECMP path 110 and a second ECMP path 112. First ECMP path 110 includes first network element 102, third transit node 107, first transit node 103, and second network element 104. Second ECMP path 112 includes first network element 102, fourth transit node 108, second transit node 106, and second network element 104. In addition, in other embodiments, more than two ECMP paths may be present.

Additionally, network 100 may further include a network controller (not shown) that provides monitoring, control, and management operations to one or more components of network 100, including first network element 102, first transit node 103, second transit node 106, third transit node 107, fourth transit node 108, and second network element 104.

Techniques shown for SR-MPLS networks are examples and apply equally to other networking control-plane protocols, including SRv6 and EVPN, using ECMP paths and indicators.

The techniques for in-band loss performance measurement described herein may use the following terms and terminology throughout this description and claims:

Flow SID: A Flow Segment Identifier (Flow SID) is used to uniquely identify the SR policy (SR-MPLS or SRv6 data plane) from an ingress node to an egress node. A Flow Segment is a new type of segment defined herein that is similar to existing segments (e.g., adjacency segments, node segments, prefix segments, etc.) already used in Segment Routing. For SR-MPLS data plane, Flow SID is an MPLS Label whereas for SRv6 data plane, Flow SID is an IPv6 address. A Flow SID can also be seen as an accounting segment indicator or accounting segment identifier in the example embodiments. In some cases, a Flow SID may be a path SID given an IP flow typically follows a single path in the network. A flow may take a different path depending on the hashing function change in forwarding, however, the flow can still be uniquely identified using the Flow Segment ID on the egress node.

It should be noted that an EVPN Flow-label allocated by the ingress node conventionally used in forwarding hashing function to take advantage of the ECMP paths in a network is not to be confused with the Flow Segment defined herein.

Access Control List (ACL): ACLs are provided at each of an ingress node (i.e., the network element at which the policy is instantiated) and an egress node (i.e., the network element at which the policy is terminated) to count packets based on the information in the fields of the packet headers (i.e., Dual Flow SIDs). In the example embodiments, two ACLs are used at each node, one ACL to count packets associated with one indicator and another ACL to count packets associated with the other indicator.

The techniques for in-band loss performance measurement according to the present embodiments may be described generally in reference to FIG. 1 and are applicable to any control-plane protocols running on a networking device. Traffic counters (e.g., ACLs) for each ECMP path (e.g., first ECMP path 110 and second ECMP path 112) may be present on each of the ingress node (e.g., first network element 102) and the egress node (e.g., second network element 104) to be used for determining performance loss measurement. Next, two or more ECMP entries are installed in forwarding tables on the ingress node (e.g., first network element 102) for forwarding traffic to the egress node (e.g., second network element 104). As shown in FIG. 1, two ECMP paths are present (e.g., first ECMP path 110 and second ECMP path 112).

The ECMP forwarding entries may be coordinated between the ingress node (e.g., first network element 102) and the egress node (e.g., second network element 104) by a network controller. For example, the network controller may coordinate selection and use of fields in packet headers to be used by the nodes to identify the traffic (i.e., a traffic indicator) being measured for performance loss measurement. The selected field in the packet header that is carried by the traffic includes a different indicator that is assigned to each of the ECMP entries. For example, in some embodiments, the selected field may be a Flow SID, an accounting label in MPLS, an ultimate-hop label in the case of SR-MPLS, a VxLAN-ID in the case of VxLAN networks, an EVPN label per EVI, EVPN Flow label, SRv6 Segment ID, or other suitable field. With this arrangement, the assigned ECMP path for a given packet may be identified by a corresponding counter at the ingress/egress nodes for the indicator associated with each ECMP path.

In some embodiments, one or more packets of a packet flow or traffic may be assigned an indicator to identify or mark the packets of the packet flow or traffic. In the example embodiments, a packet may be marked with one of two different indicators. In other words, each packet is marked with one indicator or the other (e.g., using a mechanism in the packet header to identify the indicator, such as a Flow SID or F SID). The indicator assigned to packets may be periodically toggled between the two options during a measurement interval. During each measurement interval, information may be collected from counters that detect a number of packets sent with the indicator assigned during the previous measurement interval for correlation (i.e., loss performance measurement determination) between the number of packets transmitted (TX) and the number of packets received (RX). In some embodiments, ACLs may be configured by a network controller, with one ACL for each ECMP path for measuring traffic sent on each ECMP path (e.g., first ECMP path 110 and second ECMP path 112) at the ingress node (e.g., first network element 102) and the egress node (e.g., second network element 104). These ACLs are configured to count packets transmitted over the ECMP paths using the selected field in the packet header that indicates the assigned indicator.

In example embodiments, the packets are counted over a measurement interval, which may be toggled between each indicator assigned to the ECMP path entries at the ingress node (e.g., first network element 102) by implementing a global load-share factor during packet forwarding or by changing the selected field in the packet header. The traffic counters (e.g., ACLs) for each ECMP path (e.g., first ECMP path 110 and second ECMP path 112) may then be used for performance loss measurement, i.e., to calculate a loss measurement value for each ECMP path. In some cases, the traffic counters may count the traffic in terms of number of packets. In other cases, the traffic counters may count the traffic in terms of bytes.

In an example embodiment, the ingress node (e.g., first network element 102) and the egress node (e.g., second network element 104) may send the traffic counters (e.g., ACLs) for each ECMP path to the network controller for calculating or determining the performance loss measurement (e.g., loss measurement value for each ECMP path) in bytes and/or packets. Additionally, it should be noted that the techniques described herein for in-band loss performance measurement may be used for two-way performance loss measurement along a bidirectional channel or path through a network.

The mechanisms of the example embodiments described herein take advantage of multiple ECMP paths for traffic flow to perform loss performance measurement determinations. In cases where a network already has multiple ECMP paths (e.g., the traffic sent over an SR policy), there are two techniques that may be applied. First, when multiple ECMP paths are already installed in forwarding by the control-plane, these ECMP paths can be periodically toggled using a load-share factor (i.e., during each measurement interval). When traffic is sent over a different ECMP path, the in-active ECMP path is checked or measured for traffic loss performance measurement determination using the traffic counters (e.g., ACLs).

Second, when multiple ECMP paths are not already installed in forwarding by the control-plane, then the ECMP path taken by the traffic may be periodically toggled by changing a field in the packet header for the traffic loss performance measurement. According to this technique, a different ECMP path is automatically chosen by a hashing function in forwarding. ACLs for matching to the different packet header fields (i.e., a different indicator in the field is assigned to each ECMP path) is used as a counter to count the traffic.

In other cases, for example, where a network may not have multiple ECMP paths already installed, the mechanisms of the example embodiments described herein for loss performance measurement may still be applied. In these cases, another ECMP path, which may be the same physical path, may be used by assigning different values to a field in the packet header (e.g., identifying an indicator for each ECMP path) to distinguish between ECMP paths. For example, by using a different SID at the end of the stack for SR networks.

With this arrangement, the techniques of the example embodiments use the ECMP paths in forwarding to continue to forward traffic and toggle the assigned ECMP path to measure the loss performance value for the traffic over the in-active ECMP path (i.e., each ECMP path is toggled on or off during successive measurement intervals).

The techniques for in-band loss performance measurement presented herein may be further described with reference to use-case examples shown in FIGS. 2-6 below.

Dual Flow SIDs for SR Policy Loss Measurement as Example

Figure 2:
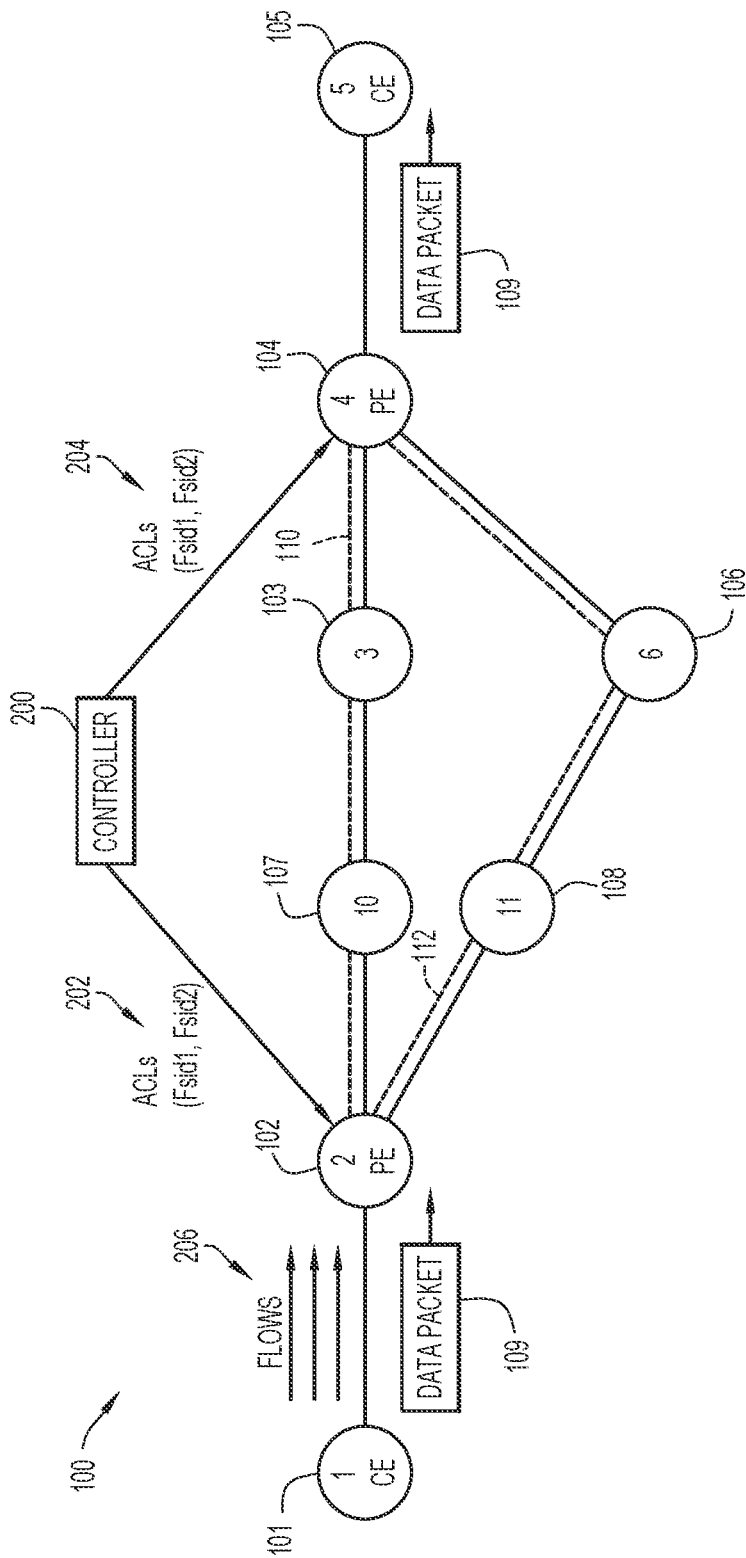
FIG. 2 is a diagram illustrating a network controller allocating dual Flow Segment Identifiers (FSIDs) for in-band loss performance measurement, according to an example embodiment.

Reference is now made to FIG. 2, which illustrates a network controller 200 allocating dual Flow Segment Identifiers (FSIDs) for in-band loss performance measurement in network 100, according to an example embodiment.

In this embodiment, network 100 includes including first network element 102, first transit node 103, second transit node 106, third transit node 107, fourth transit node 108, and second network element 104, as described above in reference to the FIG. 1. Additionally, in this embodiment, network 100 further includes network controller 200. In some embodiments, network controller 200 may be configured to implement mechanisms for in-band loss performance measurement in network 100.

In this embodiment, Dual Flow Segment Identifiers (FSIDs) that are locally unique on the egress node (e.g., second network element 104) are downloaded by network controller 200 to identify traffic flows on an SR policy (i.e., MPLS label for SR-MPLS or IPv6 address for SRv6 data plane). Locally unique Dual Flow SIDs (e.g., Fsid1 and Fsid2) are allocated for each SR policy that terminates on the node. The Dual Flow SIDs are locally unique for each {ingress-node, egress-node, SR policy}. For example, in this embodiment, the Dual Flow SIDs (e.g., Fsid1 and Fsid2) are locally unique for {first network element 102, second network element 104, and SR policy (Loss Measurement)}. Flow SIDs can also help with additional use-cases for bidirectional SR policy as it allows identification of the forward SR policy on which traffic is received and that can be used to find the reverse direction SR Policy.

The ingress node (e.g., first network element 102) installs the Dual Flow SIDs as two separate ECMP paths (e.g., first ECMP path 110 and second ECMP path 112) in a forwarding table. During successive measurement intervals, first network element 102 toggles the weight of the ECMP path (i.e. using a load-share factor) to either zero "0" (i.e., for the in-active ECMP path) or one "1" (i.e., for the active ECMP path) to associate the traffic with one indicator or the other.

ACLs 202, 204 are configured by network controller 200 to count traffic for two identifiers matching Flow SIDs on the ingress node (e.g., first network element 102) of the SR policy. For example, as shown in FIG. 2, network controller 200 provides a pair of ACLs 202 to the ingress node (e.g., first network element 102) for each ECMP path (i.e., Fsid1 for first ECMP path 110, and Fsid2 for second ECMP path 112). Similarly, network controller 200 also provides a pair of ACLs 204 to the egress node (e.g., second network element 104) for each ECMP path (i.e., Fsid1 for first ECMP path 110, and Fsid2 for second ECMP path 112).

In an example embodiment, the ingress node (i.e., first network element 102) alternates sending traffic over each ECMP path, including first ECMP path 110 (i.e., Fsid1) and second ECMP path 112 (i.e., Fsid2), during a periodic measurement interval. For example, during a first measurement interval, first network element 102 assigns a first indicator (e.g., Fsid1) to packets of a plurality of packets from traffic 206 that are transmitted over the active ECMP path, in this case, first ECMP path 110. During this first measurement interval, counters at first network element 102 and second network element 104 associated with the other ECMP path (e.g., in-active second ECMP path 112) are frozen. Similarly, during a second measurements interval, first network element 102 assigns a second indicator (e.g., Fsid2) to packets of a plurality of packets from traffic 206 that are transmitted over the now active other ECMP path, in this case, second ECMP path 112. During this second measurement interval, counters at first network element 102 and second network element 104 associated with first ECMP path 110 are frozen.

The traffic counters (e.g., measured in number of packets and/or bytes) from the ingress node (e.g., first network element 102) and the egress node (e.g., second network element 104) may be sent via event driven telemetry (EDT) to network controller 200 for measuring and determining a loss measurement value for loss performance measurement. Additionally, in some embodiments traffic counters may also be established on a per traffic class basis for each ECMP path, when enabled.

In an example embodiment, the periodic measurement interval may be a predetermined amount of time. For example, in one embodiment, the measurement intervals may be approximately every 2 minutes. Thus, the ECMP path assigned to the packets at the ingress node (i.e., first network element 102) are toggled between the two ECMP paths (e.g., first ECMP path 110 and second ECMP path 112) every two minutes. In other embodiments, the predetermined amount of time may be shorter or longer, and, in some cases, may be based on the amount of traffic or number of packets received in packet flow 206 from first customer edge node 101.

Additionally, network controller 200 may reserve a global block for all routers in network 100 for Loss Measurement purposes and allocates the Dual Flow SIDs for SR policies without involving egress nodes of the SR policies.

Egress Node Allocated Dual Flow SIDs

Figure 3:
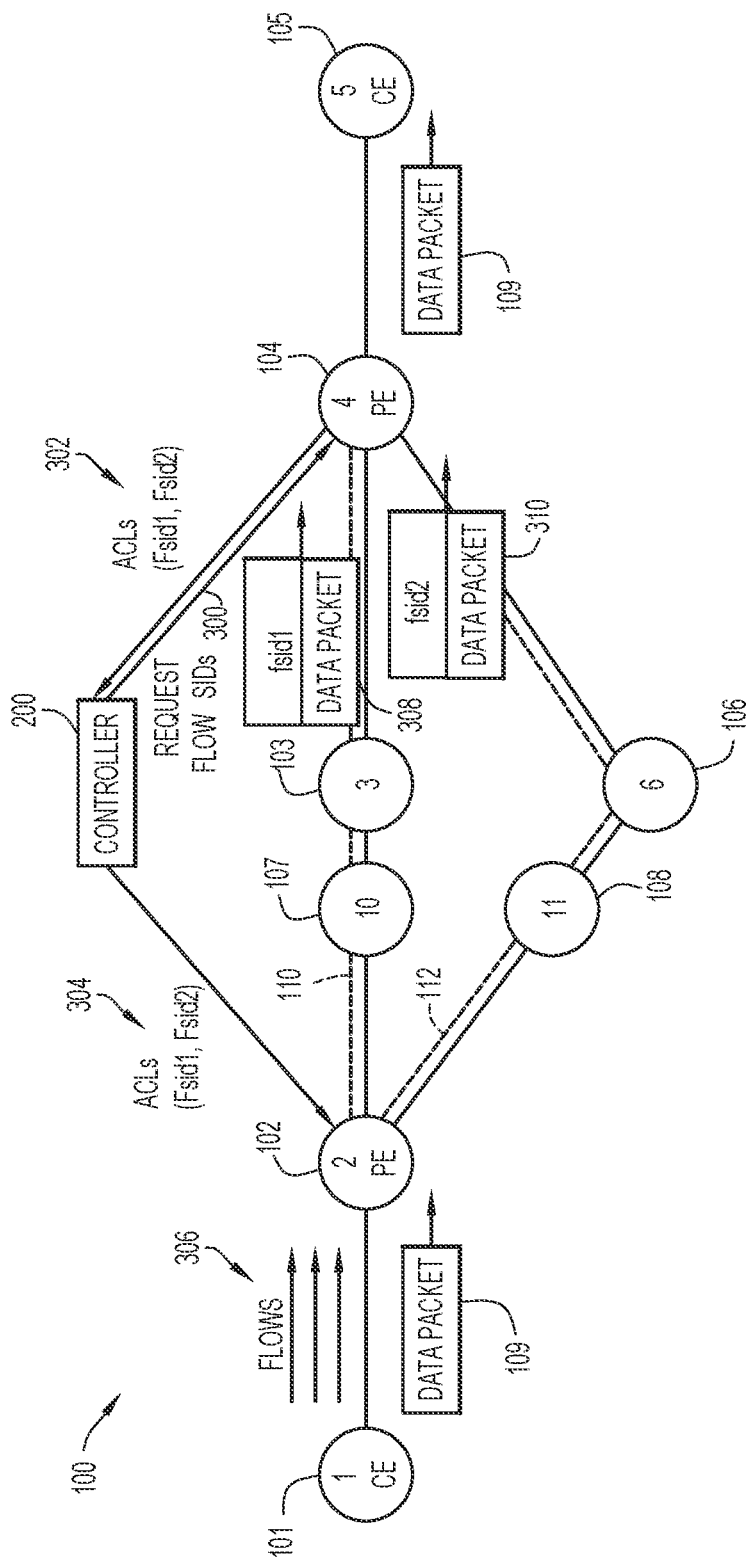
FIG. 3 is a diagram illustrating an egress node allocating dual Flow SIDs for in-band loss performance measurement, according to an example embodiment.

Referring now to FIG. 3, a diagram illustrating an egress node (e.g., second network element 104) allocating Dual Flow SIDs for in-band loss performance measurement is shown according to an example embodiment. In this embodiment, the egress node (e.g., second network element 104) of the SR policy allocates the locally unique Dual Flow SIDs (e.g., Fsid1, Fsid2) corresponding to each ECMP path (e.g., first ECMP path 110 and second ECMP path 112).

As shown in FIG. 3, in this embodiment, network controller 200 sends a request 300 to the egress node (e.g., second network element 104) for the Dual Flow SIDs that are allocated for in-band loss performance measurement. Second network element 104 provides Dual Flow SIDs (e.g., Fsid1, Fsid2) 302 to network controller 200. These Dual Flow SIDs are then communicated to the ingress node (i.e., first network element 102) of the SR policy by network controller 200 via ACLs 304.

Accordingly, when first data packet 109 from a traffic flow 306 is forwarded through network 100 from first network element 102 (i.e., ingress node) to second network element 104 (i.e., egress node), it may be transmitted along one of at least two ECMP paths, first ECMP path 110 or second ECMP path 112. In this embodiment, when first data packet 109 is transmitted along first ECMP path 110, first data packet 109 may include a first identifier 308 (e.g., Fsid1) that has been assigned to first ECMP path 110. Similarly, when first data packet 109 is transmitted along second ECMP path 112, first data packet 109 may include a second identifier 310 (e.g., Fsid2) that has been assigned to second ECMP path 112. For example, first identifier 308 (e.g., Fsid1) or second identifier 310 (e.g., Fsid2) may be included in a field of a packet header of data packet 109.

In a variant, the Flow SIDs may be signaled via Border Gateway Protocol-Traffic Engineering (BGP-TE) techniques from the egress node to the ingress node (i.e., from second network element 104 to first network element 102) of the SR policy.

In another variant, more than two Flow SIDs may be allocated by the egress node that can be toggled by the ingress node. This arrangement allows for faster detection and/or measurement intervals for loss performance measurement as counters for a Flow SID can be frozen for more than one measurement interval.

Figure 4:
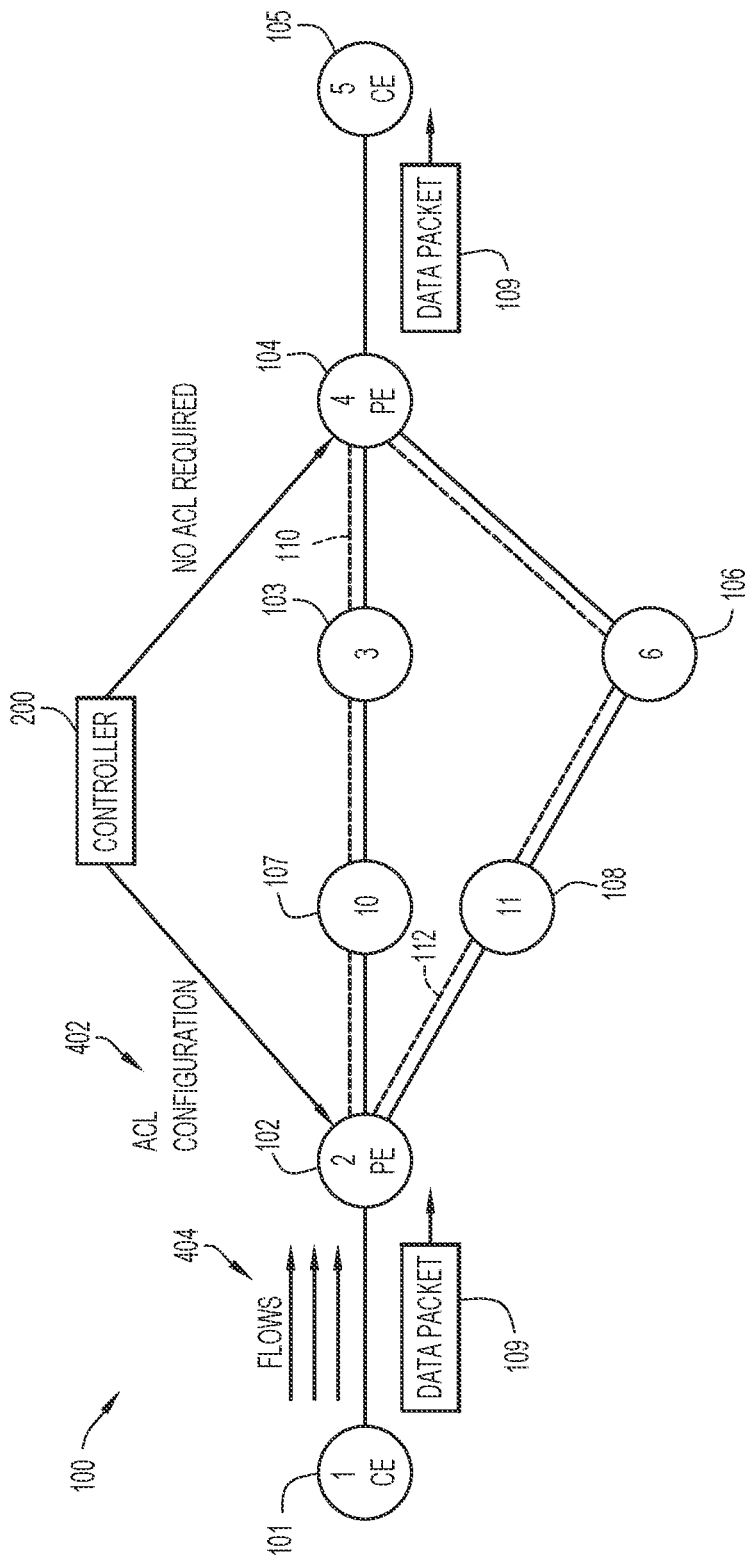
FIG. 4 is a diagram illustrating Access Control Lists (ACLs) for traffic counters for in-band loss performance measurement, according to an example embodiment.

FIG. 4 is a diagram illustrating ACLs for traffic counters for in-band loss performance measurement, according to an example embodiment. In this embodiment, the ingress node (e.g., first network element 102) measures traffic 404 for SR policy for each ECMP path (i.e., Fsid1 for first ECMP path 110, and Fsid2 for second ECMP path 112) by applying two ACLs to the SR policy corresponding to the two different indicators (i.e., one for each of Fsid1 and Fsid2).

As shown in FIG. 4, the two ACLs 402 at the ingress node (e.g., first network element 102) are configured by network controller 200. The two ACLs 402 are configured to provide: POL.C counters, where C is 0 or 1. These ACLs 402 allow network controller 200 to allocate the two counters for the SR policy to count packets transmitted over each ECMP path. These SR policy counters 402 survive any preference/candidate-paths/segment-list changes.

The egress node (e.g. second network element 104) measures traffic 404 received on each ECMP path (i.e., Fsid1 for first ECMP path 110, and Fsid2 for second ECMP path 112) and does not require ACL configuration by network controller 200. This involves double stats counters per SR policy on the ingress and egress node linecards (LCs). For example, an additional 1K counters for 1K policies on the ingress and egress node LCs. This is not an issue on existing LC hardware.

ECMP Paths in Forwarding for Dual Flow SIDs

Figure 5:
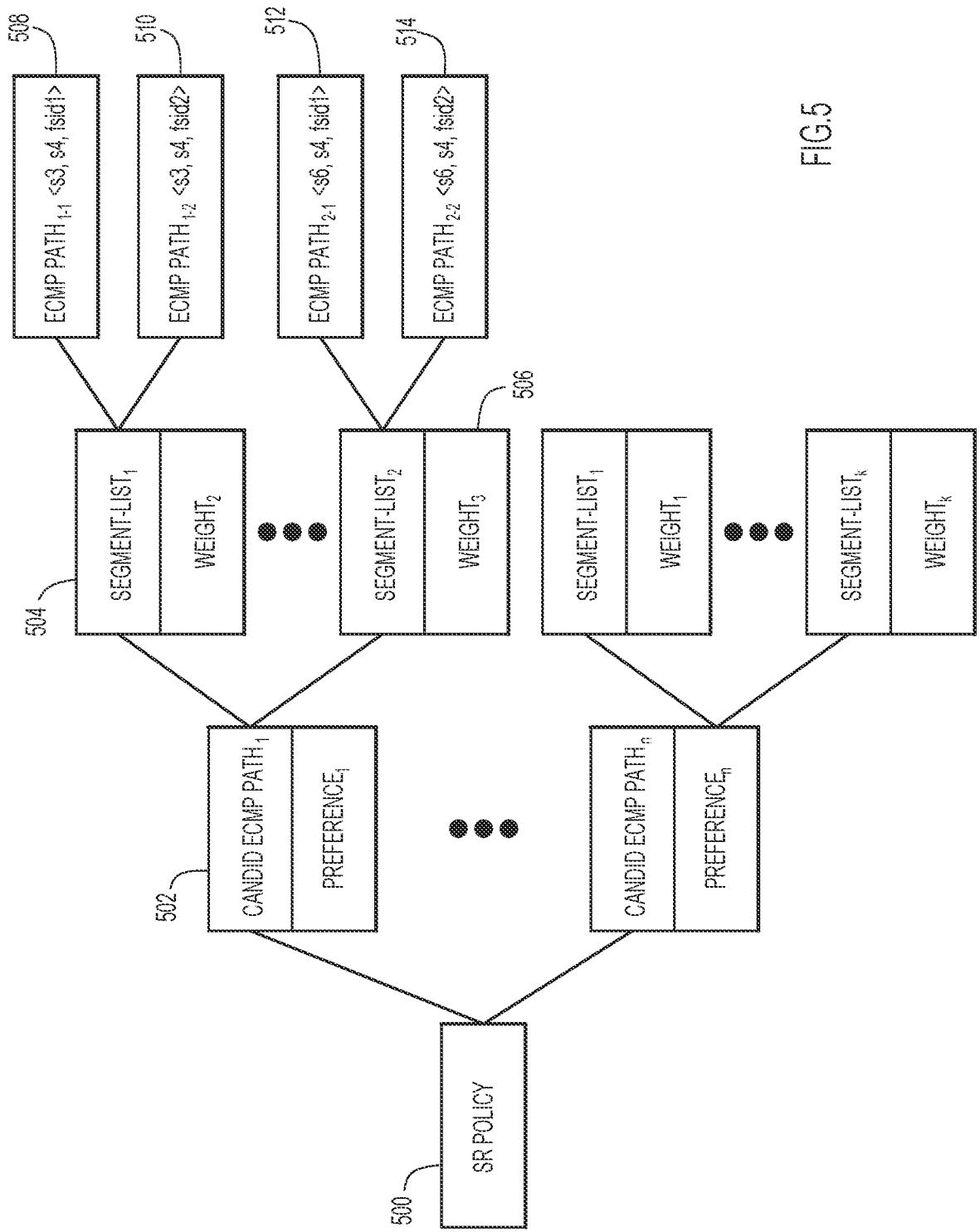
FIG. 5 is a diagram illustrating Equal Cost Multi-Path (ECMP) paths in forwarding using dual Flow SIDs, according to an example embodiment.

FIG. 5 illustrates ECMP paths in forwarding using Dual Flow SIDs. In this embodiment, Dual Flow SIDs that are downloaded by a network controller, for example, network controller 200, are Fsid1 for first ECMP path 110 and Fsid2 for second ECMP path 112. In this embodiment, a Segment Routing Traffic Engineering (SRTE) process in the control-plane on the ingress node (e.g., first network element 102) of the SR policy 500 installs two ECMP path rewrites in the forwarding table for each path of the segment-list. The first ECMP rewrite contains Fsid1 and the second ECMP rewrite contains Fsid2 at the bottom of the label stack.

As shown in FIG. 5, SR policy 500 installs the two ECMP path rewrites in the forwarding table for each path. For example, for a first candidate path 502, the SRTE process installs two ECMP path rewrites to a first segment list 504, which results in a first rewritten segment list 508 that includes Fsid1 at the end of the segment list and a second rewritten segment list 510 that includes Fsid2 at the end of the segment list. Similarly, the SRTE process also installs two ECMP path rewrites to a second segment list 506, which results in a third rewritten segment list 512 that includes Fsid1 at the end of the segment list and a fourth rewritten segment list 514 that includes Fsid2 at the end of the segment list.

Typically, a platform can support up to 256 ECMP paths, as a result, doubling the number of ECMP paths in the forwarding table according the SRTE process described above with reference to FIG. 5 does not cause issues.

Global Load Share Factor for ECMP Paths in Forwarding per Flow SID

In some embodiments, a global weight factor (i.e., a load-share factor) may be defined on the ingress node (e.g., first network element 102) linecard, which may be used to toggle between each ECMP path over a periodic measurement interval. For example, by defining the weight factor in a Segment Routing Global Block (SRGB) memory on a router where source-address is also stored as "1 m_weight", which may be toggled to either zero "0" (i.e., ECMP path is in-active or off) or one "1" (i.e., ECMP path is active or on) during each successive periodic measurement interval.

Each path weight in the forwarding table may be multiplied by the "1 m_weight" (i.e., "1") in data-plane for Fsid1 and "~1 m_weight" (i.e., "0", which is the complement operation of 1 m_weight of "1") for Fsid2 while forwarding data packets as following:

SR Policy FOO
Candidate-path Preference 100
Explicit LIST1
Path1 ECMP Rewrites in forwarding table:

---
LIST1_ECMP_PATH1: <s3, fsid1>, outgoing-interface1,
weight(2) * lm_weight
LIST1_ECMP_PATH2: <s3, fsid2>, outgoing-interface1,
weight(2) * (~lm_weight)
---

Explicit LIST2
Path2 ECMP Rewrites in forwarding table:

---
LIST2_ECMP_PATH1: <s6, fsid1>, outgoing-interface2,
weight(3) * lm_weight
LIST2_ECMP_PATH2: <s6, fsid2>, outgoing-interface2,
weight(3) * (~lm_weight)
---

Traffic Counters and EDT

Figure 6:
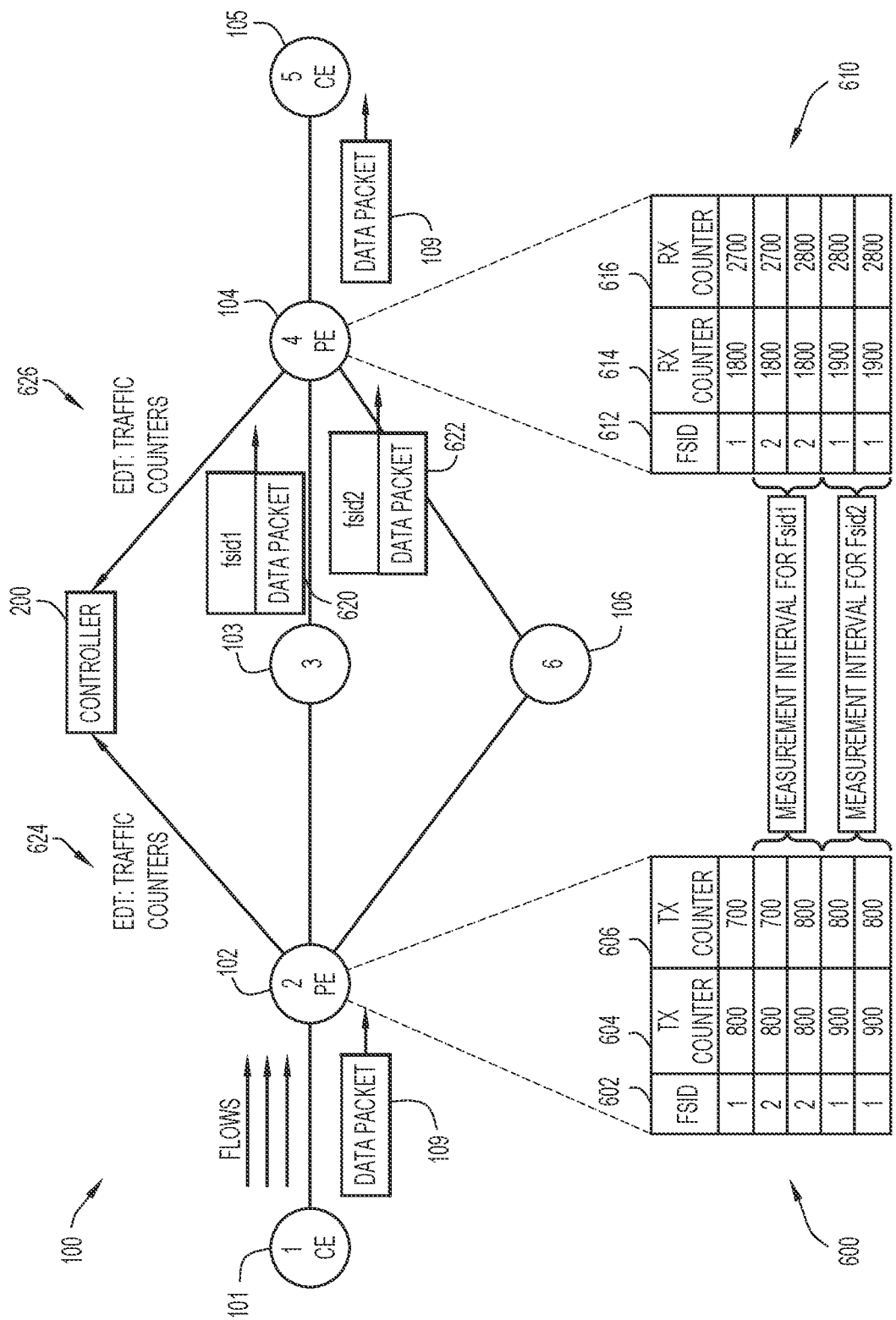
FIG. 6 is a diagram illustrating traffic counters and Event Driven Telemetry (EDT) for in-band loss performance measurement, according to an example embodiment.

FIG. 6 is a diagram illustrating traffic counters and Event Driven Telemetry (EDT) for in-band loss performance measurement, according to an example embodiment.

Referring to FIG. 6, in this embodiment, traffic including first data packet 109 may be transmitted over one of two ECMP paths having unique Dual Flow SIDs (i.e., Fsid1 for a first ECMP path, and Fsid2 for a second ECMP path). As previously described, the ingress node (i.e., first network element 102) and the egress node (i.e., second network element 104) each include two ACLs, one for each ECMP path assigned to packets begin transmitted over network 100. In this embodiment, first network element 102 includes a stored table or data structure 600 that includes an identifier 602, a first transmit (TX) counter 604 configured to count packets assigned to be transmitted over the first ECMP path (i.e., Fsid1), and a second transmit (TX) counter 606 configured to count packets assigned to be transmitted over the second ECMP path (i.e., Fsid2).

Similarly, second network element 104 includes a stored table or data structure 610 that includes an identifier 612, a first receive (RX) counter 614 configured to count packets received over the first ECMP path (i.e., Fsid1), and a second receive (RX) counter 616 configured to count packets received over the second ECMP path (i.e., Fsid2).

By toggling the weight factor 1 m_weight (i.e., the load-share of the path) factor between "0" and "1" during each successive periodic measurement interval, the ingress node (i.e., first network element 102) linecard sends traffic with Fsid1, for example, a data packet 620, during a first measurement interval and then sends traffic with Fsid2, for example, a data packet 622, during a second measurement interval. This process may continue to toggle ECMP paths back and forth between successive measurement intervals.

In some embodiments, the toggling of 1 m_weight may be implemented by a performance management (PM) process running on the linecard host CPU of the ingress node (e.g., first network element 102). The PM process running on the linecard host CPU of the ingress node (e.g., first network element 102) collects the ACL counters for the previous indicator (i.e., Fsid1 or Fsid2). Additionally, the ACL counter for the SR policy for a given 1 m_weight are incremented by microcode at the respective ingress/egress node.

During each successive measurement interval, counters (measured in packets and/or bytes) for the traffic sent over the previous ECMP path (at the time of path change) can be sent via event driven telemetry (EDT) by the ingress node (e.g., first network element 102) and the egress node (e.g., second network element 104) to network controller 200 for measuring and detecting packet loss for determining a loss measurement value. For example, as shown in FIG. 6, during the first measurement interval, first network element 102 and second network element 104 may send counters associated with the first ECMP path (i.e., Fsid1) to network controller 200 (i.e., first TX counter 604 from first network element 102 and first RX counter 614 from second network element 104). Similarly, during the second measurement interval, first network element 102 and second network element 104 may send counters associated with the second ECMP path (i.e., Fsid2) to network controller 200 (i.e., second TX counter 606 from first network element 102 and second RX counter 616 from second network element 104). In this embodiment, the counters at first network element 102 are independent from the counters at second network element 104 (i.e., they are not synchronized).

In an example embodiment, network controller 200 may use the received counters from first network element 102 and second network element 104 to determine a loss measurement value for the plurality of packets assigned to each ECMP path based on a difference (e.g., in number of packets and/or bytes) between packets measured by the counters of first network element 102 and packets measured by the corresponding counters of second network element 104. For example, network controller 200 may determine a loss measurement value for a first plurality of packets assigned to a first ECMP path (i.e., Fsid1) based on a difference between packets measured by first TX counter 604 from first network element 102 and packets measured by first RX counter 614 from second network element 104. Similarly, network controller 200 may determine a loss measurement value for a second plurality of packets assigned to a second ECMP path (i.e., Fsid2) based on a difference between packets measures by second TX counter 606 from first network element 102 and packets measured by second RX counter 616 from second network element 104.

According to this example, the number of packets measured by first TX counter 604 of first network element 102 during the first measurement interval is 100 (i.e., the change in the number of packets counted between successive measurement intervals—700 v. 800) and the number of packets measured by first RX counter 614 of second network element 104 during the first measurement interval is also 100

(i.e., the change in the number of packets counted between successive measurement intervals~2700 v. 2800). Thus, the loss measurement value for the first plurality of packets assigned to the first ECMP path is zero. Similarly, the number of packets measured by second TX counter 606 of first network element 102 during the second measurement interval is 100 (i.e., the change in the number of packets counted between successive measurement intervals—800 v. 900) and the number of packets measured by second RX counter 616 of second network element 104 during the second measurement interval is also 100 (i.e., the change in the number of packets counted between successive measurement intervals—1800 v. 1900). Thus, the loss measurement value for the second plurality of packets assigned to the second ECMP path is also zero.

Figure 7:
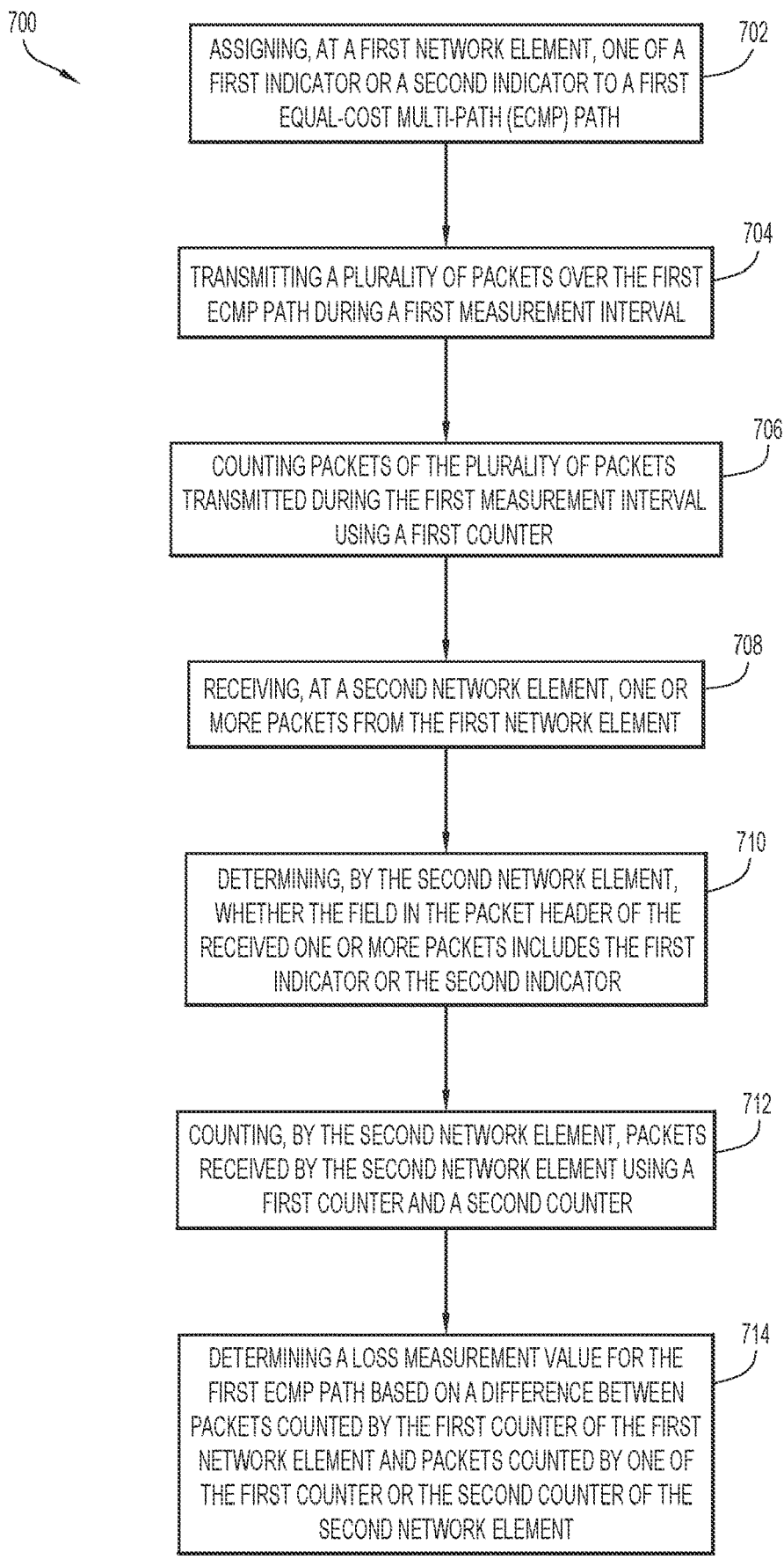
FIG. 7 is a flowchart of a method for in-band loss performance measurement, according to an example embodiment.

FIG. 7 is a flowchart of a method 700 for implementing techniques for in-band loss performance measurement in network 100, according to an example embodiment. In this embodiment, method 700 may be implemented by ingress and egress nodes in a network, for example, first network element 102 and second network element 104, described above. Additionally, method 700 may be implemented concurrently by multiple nodes in network 100, for example, to measure loss measurement values between different pairs of ingress and egress nodes in a network.

In this embodiment, method 700 may begin at an operation 702 where a first network element or an ingress node assigns one of a first indicator or a second indicator to a first ECMP path from the first network element to a second network element. For example, as shown in FIG. 1, first network element 102 may be the ingress node for traffic or packet flow including first data packet 109 from first customer edge node 101 that may be assigned to one of first ECMP path 110 or second ECMP path 112 by first network element 102.

Next, at an operation 704, method 700 includes transmitting a plurality of packets from the first network element over the first ECMP path during a first measurement interval. Operation 704 also includes including a field in a packet header of each packet of the plurality of packets that are transmitted over the first ECMP path for one of the first indicator or the second indicator associated with the first ECMP path. For example, as described above, Fsid1 may be the indicator for first ECMP path 110 and Fsid2 may be the indicator for second ECMP path 112.

An operation 706 includes counting, by the first network element, packets of the plurality of packets that are transmitted by the first network element during the first measurement interval using an associated counter for that indicator. For example, as shown in FIG. 6, first network element 102 includes stored table or data structure 600 with first TX counter 604 for measuring packets transmitted over the first ECMP path associated with the first indicator (e.g., Fsid1) and second TX counter 606 for measuring packets transmitted over the second ECMP path associated with the second indicator (e.g., Fsid2).

Next, method 700 includes an operation 708 where one or more packets from the first network element (i.e., the ingress node) are received by a second network element or an egress node. Method 700 also includes an operation 710, where the second network element determines whether the filed in the packet header of received packets includes the first indicator or the second indicator. For example, as shown in FIG. 1, second network element 104 receives one or more packets from the plurality of packets transmitted or sent by first network element 102 and second network element 104 then determines which indicator (i.e., first indicator=Fsid1, or second indicator=Fsid2) included with the packets identifies the assigned ECMP path. Each packet of the plurality of packets may include an identifier for the assigned ECMP path, which may be located in the packet header, as described in the various embodiments herein.

An operation 712 of method 700 includes counting, by the second network element packets received at the second network element that include the first indicator (i.e., Fsid1 for first ECMP path) and the second indicator (i.e., Fsid2 for the second ECMP path) using an associated counter for each ECMP path. For example, as shown in FIG. 6, second network element 104 includes stored table or data structure 610 with first RX counter 614 for counting packets received over the first ECMP path associated with the first indicator (e.g., Fsid1) and second RX counter 616 for counting packets received over the second ECMP path associated with the second indicator (e.g., Fsid2).

Method 700 further includes an operation 714 where a loss measurement value for the first ECMP path is determined. Operation 714 includes determining the loss measurement value for the first ECMP path based on a difference between the packets counted by the first counter of the first network element and the packets counted by one of the first counter or the second counter of the second network element. For example, where the first ECMP path is associated with the first indicator (i.e., Fsid1), determining the loss measurement value at operation 714 includes determining the difference between the packets counted by first TX counter 604 at first network element 102 and the packets counted by first RX counter 614 at second network element 104 during the first measurement interval. As described above, counters may measure packets by number and/or bytes, with the resulting calculation of the loss measurement value being determined in corresponding units.

In some embodiments, operation 714 may be performed by a central controller (e.g., network controller 200), which receives the counters from the ingress node and the egress node (e.g., first network element 102 and second network element 104).

Upon performing method 700 to determine one or more loss measurement values, a responsive action may be taken, for example, by network controller 200 and/or one or more nodes, including first network element 102 and/or second network element 104. Responsive actions include, but are not limited to: changing a path for a packet flow (e.g., a path protection switchover), signal a failure to a network administrator or other controller, instantiate a new path between nodes, diverting traffic, implementing a new policy, as well as other actions that may mitigate or correct any packet loss determined based on the loss performance measurement techniques described herein.

Figure 8:
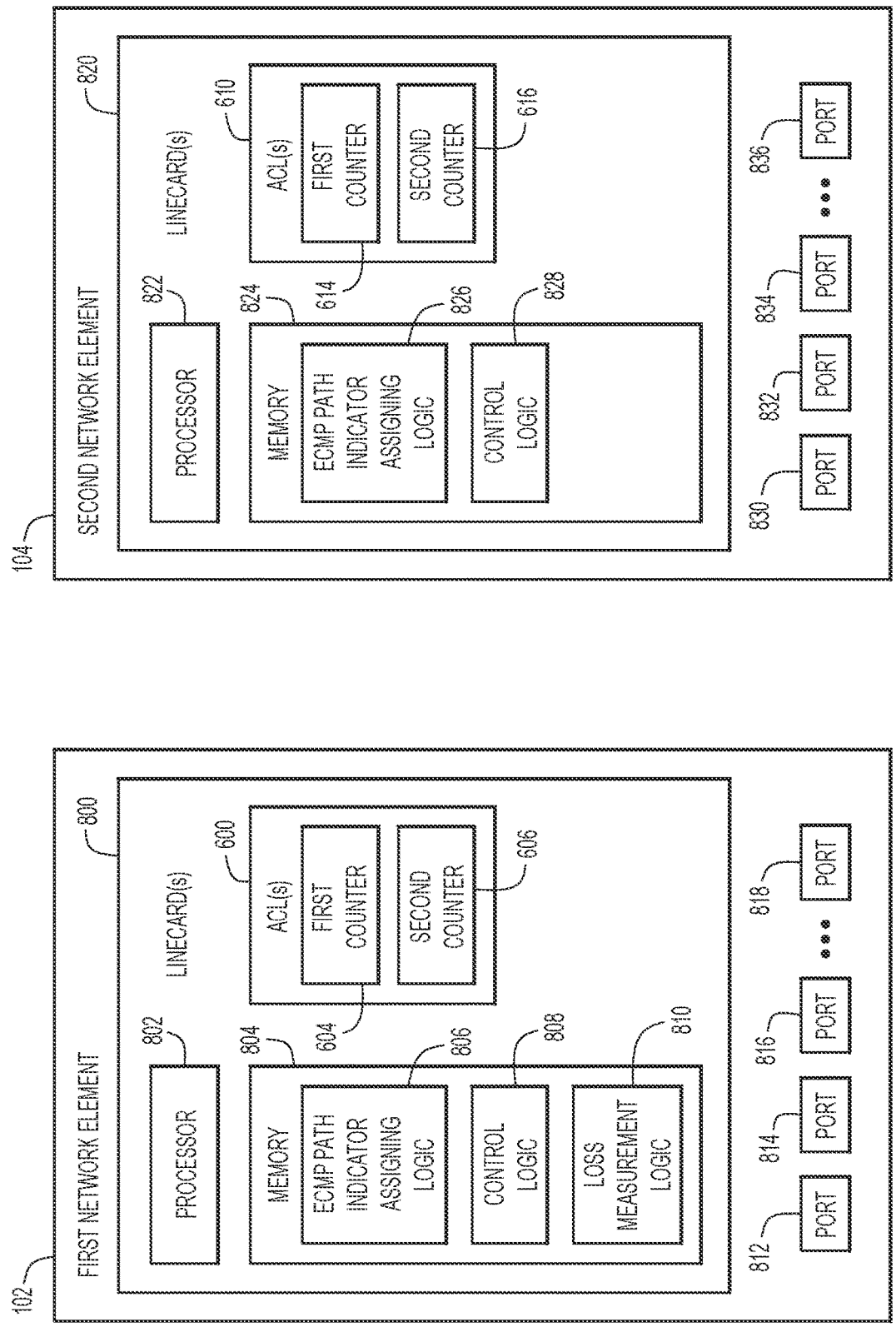
FIG. 8 is a block diagram of a pair of network elements for implementing techniques for in-band loss performance measurement, according to an example embodiment.

FIG. 8 is a block diagram of a pair of network elements for implementing techniques for in-band loss performance measurement, according to an example embodiment. In this embodiment, a representative ingress node (e.g., first network element 102) and a representative egress node (e.g., second network element 104) configured to perform techniques for in-band loss performance measurement in network 100 described herein are shown. Other nodes in network 100 may have a similar configuration to perform these in-band loss performance measurement techniques. First network element 102 may include a linecard 800. While one linecard 800 is shown in FIG. 8, it is to be understood that a network element or node, including first network element 102 and/or second network element 104, may have multiple linecards.

Linecard 800 may include a processor 802 and a memory 804. Linecard 800 may also include additional components not shown in FIG. 8, such as a ternary content-addressable memory (TCAM), a Media Access Control (MAC) table, and an L2/L3 Forwarding Engine. These components may be embodied as a hardware ASIC in some embodiments. Various operations of a node, including an ingress node or egress node (e.g., first network element 102 and second network element 104) described above may be embodied by instructions stored in memory 804 and executed by processor 802. For example, memory 804 may include instructions for implementing one or more of an ECMP path indicator assigning logic 806, operation or control logic 808, and/or a loss measurement logic 810 to implement various operations of first network element 102 described above in reference to FIGS. 1-7.

In an example embodiment, ECMP path indicator assigning logic 806 may include one or more operations for assigning an indicator to each ECMP path to be included with packets of a plurality of packets sent over a given ECMP path. Additionally, ECMP path indicator assigning logic 806 may also include operations for toggling between two ECMP path assignments over successive measurement intervals, as described above, when executed by processor 802. Operation or control logic 808 may include instructions for operating first network element 102 when executed by processor 802. In addition, loss measurement logic 810 may include one or more operations for determining loss measurement values, including sending and receiving counter values, as described above, when executed by processor 802.

Linecard 800 may also include stored table or data structure 600 that includes first counter 604 configured to count packets to be transmitted over a first ECMP path associated with a first indicator (e.g., Fsid1), and second counter 606 configured to count packets to be transmitted over a second ECMP path associated with a second indicator (e.g., Fsid2). As described above, in some embodiments, first counter 604 and second counter 606 may be established via ACLs associated with the SR policy for loss performance measurement from network controller 200.

First network element 102 may also include a plurality of network ports 812, 814, 816, 818, which may include uplink and/or downlink ports, at which ingress traffic is received at first network element 102 and from which egress traffic is transmitted from first network element 102. The number of ports shown in FIG. 8 is only by way of example and it should be understood that there may be more or fewer ports on first network element 102.

Second network element 104 may have a similar configuration as first network element 102. In this embodiment, second network element 104 includes a linecard 820 having a processor 822 and a memory 824. Linecard 820 may also include additional components not shown in FIG. 8, such as a ternary content-addressable memory (TCAM), a Media Access Control (MAC) table, and an L2/L3 Forwarding Engine. These components may be embodied as a hardware ASIC in some embodiments. Various operations of a node, including an ingress node or egress node (e.g., first network element 102 and second network element 104) described above may be embodied by instructions stored in memory 824 and executed by processor 822. For example, memory 824 may include instructions for implementing one or more of an ECMP path indicator determining logic 826 and/or operation or control logic 828 to implement various operations of second network element 104 described above in reference to FIGS. 1-7.

In an example embodiment, ECMP path indicator determining logic 826 may include one or more operations for determining the indicator included in received packets of a plurality of packets associated with an assigned ECMP path for the traffic, as described above, when executed by processor 822. Operation or control logic 828 may include instructions for operating second network element 104 when executed by processor 822.

Linecard 820 may also include stored table or data structure 610 that includes first counter 614 configured to count packets received over a first ECMP path associated with a first indicator (e.g., Fsid1), and second counter 616 configured to count packets received over a second ECMP path associated with a second indicator (e.g., Fsid2). As described above, in some embodiments, first counter 614 and second counter 616 may be established via ACLs associated with the SR policy for loss performance measurement from network controller 200.

Second network element 104 also includes a plurality of network ports 830, 832, 834, 836, which may include uplink and/or downlink ports, at which ingress traffic is received at second network element 104 and from which egress traffic is transmitted from second network element 104. The number of ports shown in FIG. 8 is only by way of example and it should be understood that there may be more or fewer ports on second network element 104.

Figure 9:
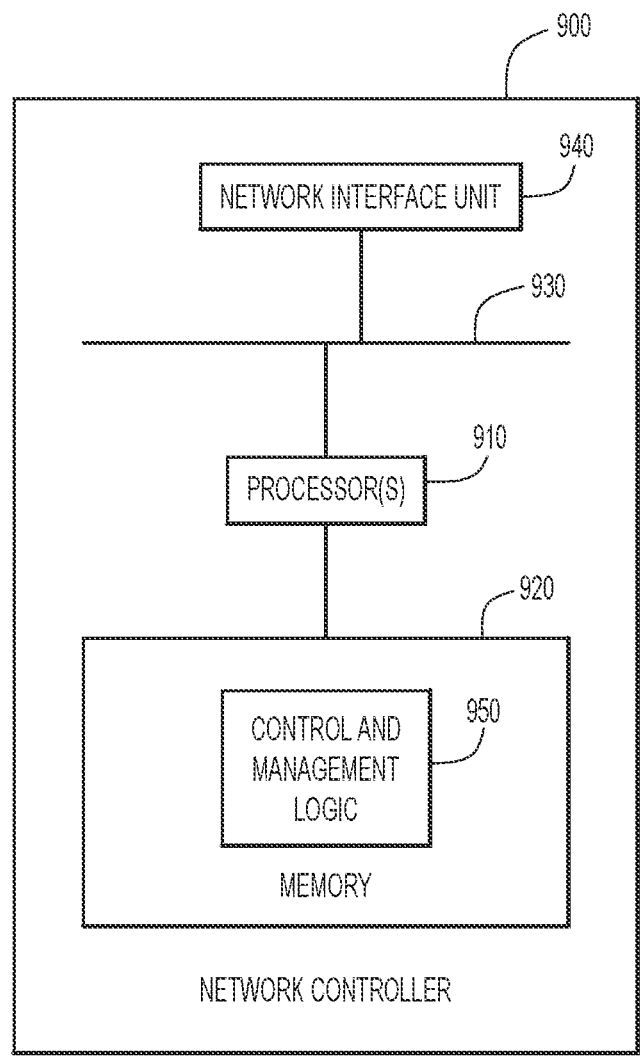
FIG. 9 is a block diagram of a network controller for implementing in-band loss performance measurement in a network, according to an example embodiment.

Reference is now made to FIG. 9. FIG. 9 illustrates a block diagram of a computing/control entity 900 that may perform the functions of network controller 200 shown in FIGS. 2, 3, 4, and 6. The computing/control entity 900 includes one or more processors 910, memory 920, a bus 930 and a network interface unit 940, such as one or more network interface cards that enable network connectivity. The memory 920 stores instructions for control and management logic 950, that when executed by the processor 910, cause the processor to perform the software defined network controller operations described herein, including operations associated with loss performance measurement, described above.

The memory 920 may include ROM of any type now known or hereinafter developed, RAM of any type now known or hereinafter developed, magnetic disk storage media devices, tamper-proof storage, optical storage media devices, flash memory devices, electrical, optical, or other physical/tangible memory storage devices. In general, the memory 920 may comprise one or more tangible (non-transitory) computer readable storage media (e.g., a memory device) encoded with software comprising computer executable instructions and when the software is executed (by the processor 910) it is operable to perform the network controller operations described herein.

In addition to the example embodiments described above, in other embodiments, additional features or considerations may be taken into account.

ECMP Hashing in Forwarding

In some embodiments, toggling the Flow SID in the label stack may potentially affect ECMP hashing function in forwarding. Some routers may use the hashing function based on the label stack. In such cases, an entropy label may be used for this purpose. Other routers do not use label stack as part of hashing function, in which case toggling the Flow SID in the label stack is not an issue.

Counters Per Traffic-Class

In some embodiments, traffic counters may be defined to count packets (measured in number of packets and/or bytes) sent over each ECMP path for each traffic-class (TC) (e.g., EXP bits according to the SR policy). In these embodiments, traffic counters may be implemented as POL.C.tc counters, where C is 0 or 1, and tc is the traffic-class.

In these cases, two ACLs are configured by a network controller for the SR policy for each TC per ECMP path. That is, for two traffic classes and two ECMP paths, four total ACLs are configured at each of the ingress node and egress node. Microcode at each node allocates counters per TC per indicator (i.e., Fsid1 or Fsid2) on LCs and reports the traffic counters (packets/bytes) to the controller for performance loss measurement.

Two-way Loss Measurement for Bidirectional SR Policy

Two-way loss measurement requires identifying on which SR policy the traffic or control packets are being received, to be able to find matching reverse SR policy. Flow SID on the egress node allows identification of the SR policy on which traffic or control packets are being received. This information can be used to find the SR policy in the reverse direction for two-way loss measurement.

Additional Use-Cases for Bidirectional SR Policy

Flow SID on the egress node allows identification of the SR policy on which traffic or control packets are being received. This information can be used to find the SR policy in the reverse direction for bidirectional channel use-cases (e.g., for transport/mobile back-haul networks, establishing adjacency, etc.).

The principles of the example embodiments described herein provide a practical solution that can be implemented in hardware microcode and, therefore, is lightweight. Moreover, the example embodiments describe a solution that does not degrade forwarding performance significantly and at the same time does not consume excessive memory.

The example embodiments described herein provide techniques for in-band "direct-mode" loss performance measurement in a network that make use of the ECMP paths of the traffic flow. The techniques described herein are applicable to various data planes, including, for example, Virtual Extensible LAN (VxLAN), Ethernet virtual private network (EVPN), SR with MPLS data plane, traditional MPLS, SR with IPv6 data plane (SRv6), RSVP-TE, LDP, IPv4/IPv6 and other control-plane routing protocols Techniques presented in this invention using dual Flow SIDs (two) with ECMP paths can be generically used with more than two Flow SIDs.

In one form, a method is provided comprising: assigning, at a first network element, one of a first indicator or a second indicator to a first equal-cost multi-path (ECMP) path from the first network element to a second network element; transmitting, from the first network element, a plurality of packets over the first ECMP path during a first measurement interval, the plurality of packets transmitted over the first ECMP path including a field in a packet header of each packet of the plurality of packets that includes the first indicator or the second indicator; counting, by the first network element, packets of the plurality of packets transmitted by the first network element during the first measurement interval using a first counter; receiving, at a second network element, one or more packets from the first network element; determining, by the second network element, whether the field in the packet header of the received one or more packets includes the first indicator or the second indicator; counting, by the second network element, packets received by the second network element that include the first indicator in the field of the packet header using a first counter and packets received by the second network element that include the second indicator in the field of the packet header using a second counter; and determining a loss measurement value for the first ECMP path based on a difference between packets counted by the first counter of the first network element and packets counted by one of the first counter or the second counter of the second network element.

In some embodiments the plurality of packets transmitted over the first ECMP path include the first indicator in the field of each packet header, and the method further comprises: assigning, at the first network element, the second indicator to a second ECMP path from the first network element to the second network element; transmitting, from the first network element, a plurality of packets over a second measurement interval; and counting, by the first network element, packets of the plurality of packets transmitted by the first network element during the second measurement interval using a second counter.

In some embodiments, a method is provided further comprising: determining a loss measurement value for the second ECMP path based on a difference between packets counted by the second counter of the first network element and packets counted by the second counter of the second network element.

In some embodiments, the method further comprises the first network element toggling between transmitting packets over the first ECMP path and the second ECMP path during successive measurement intervals.

In some embodiments, toggling between transmitting packets over the first ECMP path and the second ECMP path during successive measurement intervals further comprises applying a weight factor to the first ECMP path and the second ECMP path.

In some embodiments, the weight factor has a value of one or zero.

In some embodiments, the weight factor with a value of one is applied to a selected one path of the first ECMP path and the second ECMP path to transmit packets over the selected one path; and the weight factor with a value of zero is applied to the other path of the first ECMP path and the second ECMP path to freeze the other path so that no packets are transmitted over the other path.

In some embodiments, a network controller for a network comprising a plurality of network elements is provided, including at least the first network element and the second network element, and the method further comprises: configuring, by the network controller, counters associated with each of the first indicator and the second indicator at the first network element and the second network element using access control lists.

In another form, one or more non-transitory computer readable storage media encoded with instructions are provided that, when executed by a processor of a first network element, cause the processor to: assign one of a first indicator or a second indicator to a first equal-cost multi-path (ECMP) path from the first network element to a second network element; transmit a plurality of packets over the first ECMP path during a first measurement interval, the plurality of packets transmitted over the first ECMP path including a field in a packet header of each packet of the plurality of packets that includes the first indicator or the second indicator; count packets of the plurality of packets transmitted by the first network element during the first measurement interval using a first counter; wherein the plurality of packets are configured to be received at a second network element, the second network element including a first counter that counts packets received by the second network element that include the first indicator in the field of the packet header and a second counter that counts packets received by the second network element that include the second indicator in the field of the packet header; and determine a loss measurement value for the first ECMP path based on a difference between packets counted by the first counter of the first network element and packets counted by one of the first counter or the second counter of the second network element.

In yet another form, an apparatus is provided comprising: a plurality of network ports configured to receive inbound packets and to send outbound packets; a memory; a processor coupled to the memory and to the plurality of network ports, wherein the processor is configured to: assign one of a first indicator or a second indicator to a first equal-cost multi-path (ECMP) path from the first network element to a second network element; transmit a plurality of packets over the first ECMP path during a first measurement interval, the plurality of packets transmitted over the first ECMP path including a field in a packet header of each packet of the plurality of packets that includes the first indicator or the second indicator; count packets of the plurality of packets transmitted by the first network element during the first measurement interval using a first counter; wherein the plurality of packets are configured to be received at a second network element, the second network element including a first counter that counts packets received by the second network element that include the first indicator in the field of the packet header and a second counter that counts packets received by the second network element that include the second indicator in the field of the packet header; and determine a loss measurement value for the first ECMP path based on a difference between packets counted by the first counter of the first network element and packets counted by one of the first counter or the second counter of the second network element.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    requesting, by a network controller, which is in communication with a first network element and a second network element that are in communication with each other via multiple equal-cost multi path (ECMP) paths, from the second network element, a first indicator and a second indicator indicative of the multiple ECMP paths;
    receiving, by the network controller, the first indicator and the second indicator from the second network element;
    transmitting, by the network controller, to the first network element, the first indicator and the second indicator;
    installing the first indicator and the second indicator as two separate ECMP paths in a forwarding table of the first network element, wherein the first indicator is an indicator of a first ECMP path and the second indicator is an indicator of a second ECMP path;
    assigning, at the first network element, the first indicator to the first ECMP path of the multiple ECMP paths and the second indicator to the second ECMP path of the multiple ECMP paths;
    transmitting, from the first network element, a plurality of packets over the first ECMP path during a first measurement interval of a plurality of measurement intervals, each packet in the plurality of packets transmitted over the first ECMP path including a field in a packet header that includes the first indicator or the second indicator, the first network element toggling between transmitting packets over the first ECMP path and the second ECMP path of the multiple ECMP paths during successive measurement intervals;
    counting, by the first network element, packets of the plurality of packets transmitted by the first network element during the first measurement interval using a first counter of the first network element;
    receiving, at the second network element, one or more packets from the first network element;
    determining, by the second network element, whether the field in the packet header of a received one or more packets includes the first indicator or the second indicator;
    counting, by the second network element, packets received by the second network element that include the first indicator in the field of the packet header using a first counter of the second network element and packets received by the second network element that include the second indicator in the field of the packet header using a second counter of the second network element; and
    determining a loss measurement value for the first ECMP path based on a difference between packets counted by the first counter of the first network element and packets counted by one of the first counter of the second network element or the second counter of the second network element,
    wherein determining the loss measurement value for the first ECMP path is performed after the first measurement interval while the first ECMP path is inactive, and while second ECMP path is active, and
    responsive to the loss measurement value, mitigating packet loss between the first network element and the second network element.

2. The method of claim 1, wherein each packet in the plurality of packets transmitted over the first ECMP path includes the first indicator in the field in the packet header, and wherein the method further comprises:
    assigning, at the first network element, the second indicator to the second ECMP path from the first network element to the second network element;
    transmitting, from the first network element, a plurality of packets over a second measurement interval; and
    counting, by the first network element, packets of the plurality of packets transmitted by the first network element during the second measurement interval using a second counter of the first network element.

3. The method of claim 2, further comprising:
    determining a loss measurement value for the second ECMP path based on a difference between packets counted by the second counter of the first network element and packets counted by the second counter of the second network element.

4. The method of claim 1, wherein toggling between transmitting packets over the first ECMP path and the second ECMP path during successive measurement intervals further comprises applying a weight factor to the first ECMP path and the second ECMP path.

5. The method of claim 4, wherein the weight factor has a value of one or zero.

6. The method of claim 5, wherein the weight factor with the value of one is applied to a selected one path of the first ECMP path and the second ECMP path to transmit packets over the selected one path; and wherein the weight factor with the value of zero is applied to the other path of the first ECMP path and the second ECMP path to freeze the other path so that no packets are transmitted over the other path.

7. The method of claim 1, further comprising:
configuring, by the network controller, counters associated with each of the first indicator and the second indicator at the first network element and the second network element using access control lists.

8. One or more non-transitory computer readable storage media encoded with instructions that, when executed by a processor, cause the processor to:
request, by a network controller, which is in communication with a first network element and a second network element that are in communication with each other via multiple equal-cost multi path (ECMP) paths, from the second network element, a first indicator and a second indicator indicative of the multiple ECMP paths;
receive, by the network controller, the first indicator and the second indicator from the second network element;
transmit, by the network controller, to the first network element, the first indicator and the second indicator;
install the first indicator and the second indicator as two separate ECMP paths in a forwarding table of the first network element, wherein the first indicator is an indicator of a first ECMP path and the second indicator is an indicator of a second ECMP path;
assign the first indicator to the first ECMP path of the multiple ECMP paths and the second indicator to the second ECMP path of the multiple ECMP paths;
transmit a plurality of packets over the first ECMP path during a first measurement interval of a plurality of measurement intervals, the plurality of packets transmitted over the first ECMP path including a field in a packet header of each packet of the plurality of packets that includes the first indicator or the second indicator, and toggle between transmitting packets over the first ECMP path and the second ECMP path of the multiple ECMP paths during successive measurement intervals;
count packets of the plurality of packets transmitted by the first network element during the first measurement interval using a first counter of the first network element;
wherein the plurality of packets are configured to be received at the second network element, the second network element including a first counter of the second network element that counts packets received by the second network element that include the first indicator in the field in the packet header and a second counter of the second network element that counts packets received by the second network element that include the second indicator in the field in the packet header;
determine a loss measurement value for the first ECMP path based on a difference between packets counted by the first counter of the first network element and packets counted by one of the first counter of the second network element or the second counter of the second network element;
wherein the loss measurement value is determined for the first ECMP path after the first measurement interval while the first ECMP path is inactive, and while second ECMP path is active, and
responsive to the loss measurement value, mitigate packet loss between the first network element and the second network element.

9. The one or more non-transitory computer readable storage media of claim 8, wherein each packet in the plurality of packets transmitted over the first ECMP path includes the first indicator in the field in the packet header, and further comprising instructions that cause the processor to:
assign the second indicator to the second ECMP path from the first network element to the second network element;
transmit a plurality of packets during a second measurement interval; and
count packets of the plurality of packets transmitted by the first network element during the second measurement interval using a second counter of the first network element.

10. The one or more non-transitory computer readable storage media of claim 9, further comprising instructions that cause the processor to:
determine a loss measurement value for the second ECMP path based on a difference between packets counted by the second counter of the first network element and packets counted by the second counter of the second network element.

11. The one or more non-transitory computer readable storage media of claim 8, wherein the toggle between transmitting packets over the first ECMP path and the second ECMP path during successive measurement intervals further comprises applying a weight factor to the first ECMP path and the second ECMP path.

12. The one or more non-transitory computer readable storage media of claim 11, wherein the weight factor that is applied to a selected one path of the first ECMP path and the second ECMP path to transmit packets over the selected one path has a value of one; and
wherein the weight factor that is applied to the other path of the first ECMP path and the second ECMP path to freeze the other path so that no packets are transmitted over the other path has a value of zero.

13. A system comprising:
a first network element;
a second network element;
a network controller, which is in communication with the first network element and the second network element, the first network element and the second network element in communication with each other via multiple equal-cost multi path (ECMP) paths, wherein the network controller is configured to:
request from the second network element, a first indicator and a second indicator indicative of the multiple ECMP paths;
receive, by the network controller, the first indicator and the second indicator;
transmit, by the network controller, to the first network element, the first indicator and the second indicator;
the first network element and the second network element including a plurality of network ports configured to receive inbound packets and to send outbound packets;
the first network element and the second network element including:
a memory; and
a processor coupled to the memory and to the plurality of network ports, wherein the processor is configured to:
install the first indicator and the second indicator as two separate ECMP paths in a forwarding table of the first network element, wherein the first indicator is an indicator of a first ECMP path and the second indicator is an indicator of a second ECMP path assign, by the first network element, the first indicator to the first ECMP path of the multiple ECMP paths and the second indicator to the second ECMP path of the multiple ECMP paths;

transmit a plurality of packets over the first ECMP path during a first measurement interval of a plurality of measurement intervals, each packet in the plurality of packets transmitted over the first ECMP path including a field in a packet header that includes the first indicator or the second indicator, the first network element toggling between transmitting packets over the first ECMP path and the second ECMP path of the multiple ECMP paths during successive measurement intervals;

count packets of the plurality of packets transmitted by the first network element during the first measurement interval using a first counter of the first network element;

wherein the plurality of packets are configured to be received at the second network element, the second network element including a first counter of the second network element that counts packets received by the second network element that include the first indicator in the field in the packet header and a second counter of the second network element that counts packets received by the second network element that include the second indicator in the field in the packet header;

determine a loss measurement value for the first ECMP path based on a difference between packets counted by the first counter of the first network element and packets counted by one of the first counter of the second network element or the second counter of the second network element, wherein the loss measurement value is determined for the first ECMP path after the first measurement interval while the first ECMP path is inactive, and while second ECMP path is active, and responsive to the loss measurement value, mitigate packet loss between the first network element and the second network element.

14. The system of claim 13, wherein the plurality of packets transmitted over the first ECMP path include the first indicator in the field in the header, and wherein the processor is further configured to:
   assign the second indicator to the second ECMP path from the first network element to the second network element;
   transmit a plurality of packets during a second measurement interval; and
   count packets of the plurality of packets transmitted by the first network element during the second measurement interval using a second counter of the first network element.

15. The system of claim 14, wherein the processor is further configured to:
   determine a loss measurement value for the second ECMP path based on a difference between packets counted by the second counter of the first network element and packets counted by the second counter of the second network element.

16. The system of claim 13, wherein toggling between transmitting packets over the first ECMP path and the second ECMP path during successive measurement intervals further comprises applying a weight factor to the first ECMP path and the second ECMP path.

17. The system of claim 16, wherein the processor is further configured to:
   apply the weight factor, with a value of one, to a selected one path of the first ECMP path and the second ECMP path to transmit packets over the selected one path; and
   apply the weight factor, with a value of zero, to the other path of the first ECMP path and the second ECMP path to freeze the other path so that no packets are transmitted over the other path.

* * * * *